April 26, 1938.  T. LARSSON  2,115,683
ABRASIVE WHEEL MOUNT
Filed June 11, 1936   2 Sheets-Sheet 1
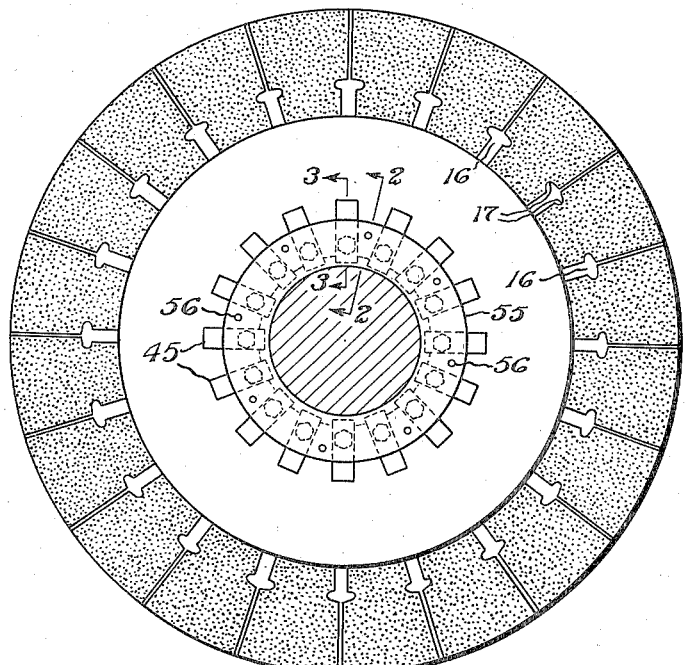
Fig. 1
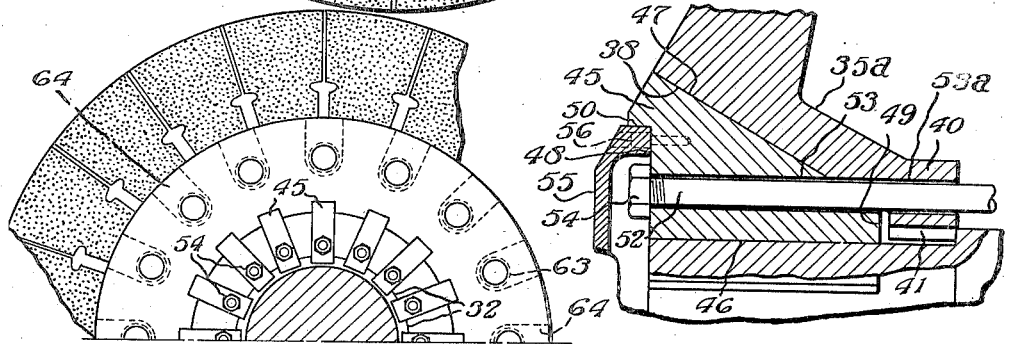
Fig. 6
Fig. 3
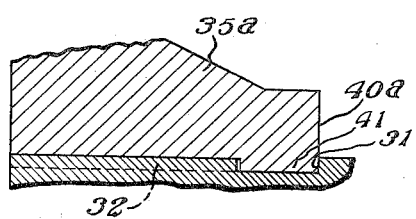
Fig. 2
Inventor
THURE LARSSON
By George Crompton Jr.
Attorney April 26, 1938. T. LARSSON 2,115,683
ABRASIVE WHEEL MOUNT
Filed June 11, 1936  2 Sheets-Sheet 2

Inventor
THURE LARSSON
By George Crompton Jr.
Attorney

Patented Apr. 26, 1938

2,115,683

UNITED STATES PATENT OFFICE 2,115,683

ABRASIVE WHEEL MOUNT

Thure Larsson, Worcester, Mass., assignor to Norton Company, Worcester, Mass., a corporation of Massachusetts Application June 11, 1936, Serial No. 84,605

4 Claims. (Cl. 51—207)

The invention relates to mountings for abrasive wheels and with regard to its more specific features to apparatus for mounting a heavy pulpstone or the like on a shaft and securing it thereto.

One object of the invention is to provide a driving connection between the shaft and the pulpstone that will compensate for any unequal thermal expansion or contraction caused by difference in the temperature of the various parts. Another object of the invention is to provide a construction of the character indicated whereby the wheel may be more readily mounted on and removed from a driving shaft. Another object of the invention is to provide a construction of the character indicated in which the wheel is clamped in position by a plurality of tightening members. Another object of the invention is to facilitate unmounting of a wheel of the type specified from a driving shaft. Another object of the invention is to provide a more positive driving connection between shaft and wheel. Another object of the invention is to provide a construction which may be quickly assembled and disassembled. Another object of the invention is to provide a construction which may be assembled or disassembled without the use of great strength or power or giant wrenches. Other object will be in part obvious or in part pointed out hereinafter.

The invention accordingly consists in the features of construction, combinations of elements, and arrangements of parts, as will be exemplified in the structure to be hereinafter described, and the scope of the application of which will be indicated in the following claims.

Figure 4:
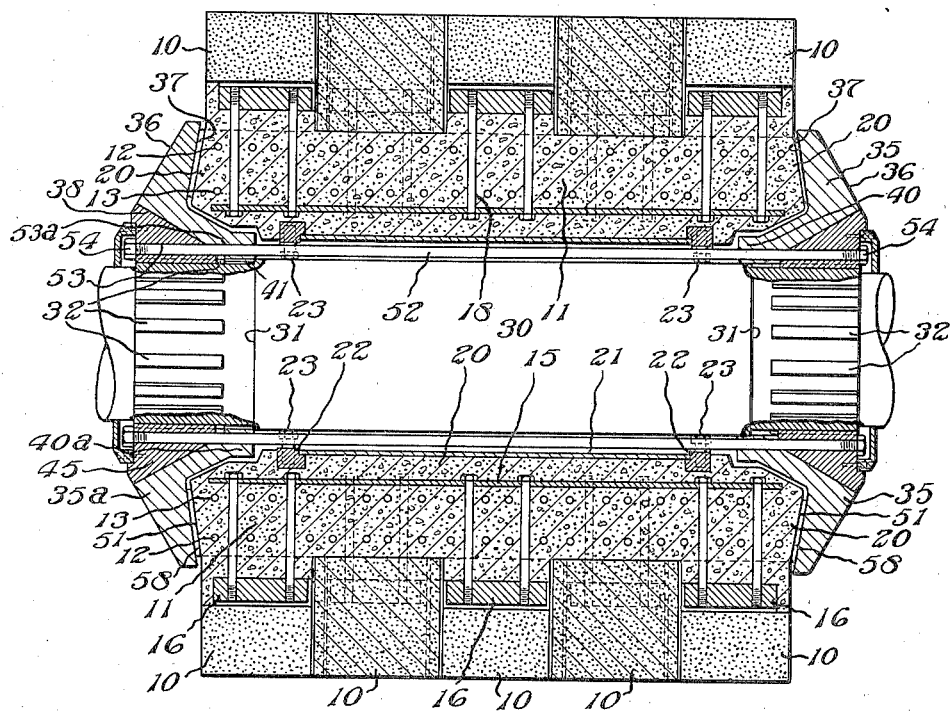
Figure 5:
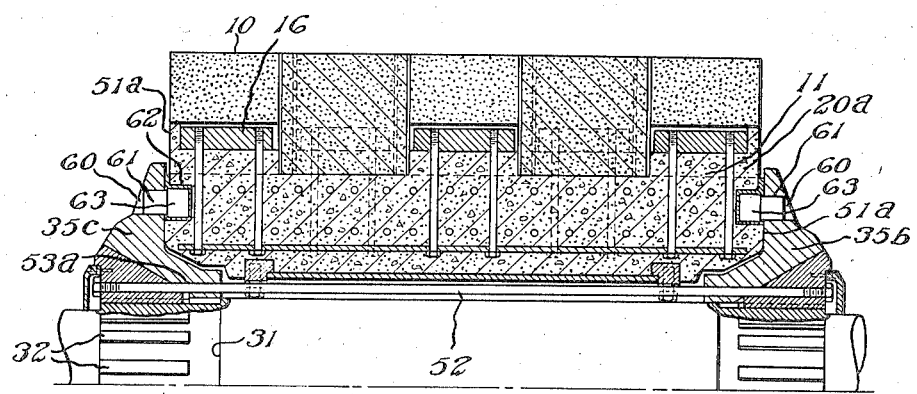

In the accompanying drawings in which are shown two of many possible embodiments of this invention, Figure 1 is an end elevation of a pulpstone grinding wheel mounted on a driving shaft which is shown in cross section, Figure 2 is a fragmentary enlarged sectional view, taken on the line 2—2 of Figure 1, Figure 3 is a view similar to Figure 2, taken on the line 3—3 of Figure 1, Figure 4 is an axial sectional view of the wheel of Figure 1, showing the driving shaft in elevation, Figure 5 is an axial sectional view of a modified form of construction, showing one-half of the wheel and mounting elements in section and one-half of the driving shaft in elevation, Figure 6 is an end elevation of the wheel and shaft of Figure 5, the shaft being shown in section.

The pulpstone to which the mounting is applied may be of any suitable or desired construction, or the mounting may be applied to other types of abrasive wheels and, indeed, to other kinds of wheels altogether. For example, the pulpstone may be constructed in accordance with the patent to George N. Jeppson and myself No. 1,865,523 granted July 5, 1932, and in accordance with the further features disclosed in my Patent No. 1,920,204 granted August 1, 1933. As disclosed in said patents, and referring now to Figures 1 and 4, the abrasive wheel comprises a plurality of abrasive sector blocks 10 secured to a central cylinder of concrete 11 having a pair of reinforcing cages 12 and 13 embedded therein and being bounded on the inside by a steel cylindrical shell 15. A plurality of wedge blocks 16 are located in opposite dovetailed grooves 17 in the sectors 10 and the wedge blocks 16 are connected to the steel cylindrical shell 15 by elastic bolts 18 which may be tightened after the concrete 11 is poured. Subsequent to the formation of the concrete 11 additional concrete 20 is poured inside the steel shell 15 and at both ends of the wheel and outside of a sheet steel cylindrical shell 21 which spaces apart a pair of rings 22, 22 having tapped holes for the reception of locating bolts 23. The concrete 20 is, in the finished article, practically indistinguishable from the concrete 11 and merges with it wherefor the drawings illustrate a solid piece of concrete which was, however, built up as described, thus allowing the bolts 18 to be tightened after the concrete 11 was poured.

Referring now particularly to Figure 4, I provide a steel shaft 30 upon which the abrasive wheel just described or any other abrasive wheel may be mounted. I provide a pair of shoulders 31 facing outwardly on the shaft 30, as shown in Figure 4. I further provide a plurality of spaced lugs 32 beyond each shoulder 31 and spaced at equal angular distances around the shaft 30 and also spaced at equal distances from the shoulder 31. Referring now to Figures 2, 3 and 4, I provide a pair of wheel flanges 35 and 35a differing in certain particulars, as hereinafter specified. Each flange 35 and 35a, however, has an exterior conical surface 36, an interior conical surface 37, and a series of wedge shaped cut-outs 38 spaced around the circumference of the flange and open at the inside of the flange, as shown in the drawings.

The flange 35 has a cylindrical portion 40 which, when the parts are assembled, extends over the shoulder 31 and rests upon the central cylindrical portion of the shaft 30. The fit is a close sliding fit. The flange 35a has a shorter cylindrical portion 40a which, when the parts are assembled, extends just to the shoulder 31 and no farther. Referring now to Figures 2 and 3, the portion 40a has projecting inwardly from it a series of lugs 41 spaced angularly around the circle the same distance apart as the lugs 32 and each of whose width in radians is no greater than the distance in radians between successive lugs 32. When the wheel and support are assembled, as shown in the drawings, a lug 41 lies back of each lug 32 and the lugs 41 fit closely between the lugs 42 and the left-hand shoulder 31. Thus the flange 35a is locked to the shaft 30 in an axial direction.

Referring now to Figures 1, 3 and 4, I provide a number of wedge blocks 45 equal to the number of lugs 32 and equal to the number of cut-outs 38. These wedge blocks 45 are rectangular in any radial cross section and fit exactly between the lugs 32 wherefor it will be seen that the lugs 32 are dovetailed in shape, as shown. The lugs 32 may be made by plain milling cutters leaving rectangular grooves in the shaft between them. The wedge blocks 45 in side view, as shown in Figure 3, have bottom portions 46 which are in planes tangent to a single imaginary cylinder coaxial with the shaft 30; their opposite sides 47 are angularly inclined, as shown, and parallel to the surfaces 38 and they have large radial surfaces 48 and are truncated at 49 so that they shall not contact the cylindrical portion 40 or 40a. They may also have overhanging shoulders 50, as shown, for a purpose to be hereinafter set forth.

In order to draw the flanges 35 and 35a together, thus gripping the end and slightly conical surfaces 51 of the grinding wheel between them, I provide a plurality of elastic tension bolts 52 equal in number to the number of wedge blocks 45 in either of the flanges 35 and 35a. As shown in Figure 4, these elastic tension bolts 52, which may be of strong steel having a high elastic limit, extend through holes 53 in the wedge blocks 45, there being such a hole in each wedge block. The bolts 52 likewise extend through holes 53a aligned with the holes 53 in the flanges 35 and 35a. The bolts 52 are threaded at each end and are secured in position by nuts 54, each nut 54 being drawn up against a surface 48. The wedge blocks key the flanges to the shaft and are wedge keys. Annular protecting flanges 55 seating between the shaft 30 and the shoulders 50 may be provided, if desired, and these may be secured to the respective flanges 35 and 35a as by means of screws 56. In case it becomes desirable to mount the wheel upon the shaft from one end only of the shaft, the flanges 55 may be made in two sections, as otherwise the mounting disclosed may be completely assembled from the left-hand end of the shaft 30.

Considering now the mounting of a wheel upon the shaft 30, I first slide the flange 35 into position, either from the right or left-hand end of the shaft 30, making sure that the cylindrical portion 40 extends over the shoulder 36. If, however, the shaft 30 is perfectly free, I may first place the shaft 30 within the wheel, carefully centering the shaft 30 in the wheel by means of the centering bolts 23. In either event I center the wheel upon the shaft or the shaft in the wheel, as the case may be, and move the wheel and flange 35 into abutting position. I prefer to place cushioning material, such as beaverboard 58, between each flange 35 or 35a and the corresponding surface 51.

Having thus located the wheel upon the shaft 30 with the flange 35 in contact with the surface 51 or the interposed beaverboard 58, and having located the cylindrical portion 40 just to the left of the shoulder 31, I may now place in position the flange 35a, from the left-hand end of the shaft 30. To do so, I enter the lugs 41 between the lugs 32 and slide the flange 35a until the cylindrical portion 40a abuts the left-hand shoulder 31, and then I turn the flange 36 so that each lug 41 will be exactly behind a corresponding lug 32, with the center lines of the lugs 32 and 41 coinciding. I then introduce the wedge blocks 45 into each flange 35 and 35a and the holes 53 therein will be in alignment. I now introduce the bolts 52 from either end and tighten the nuts 54. In doing so I draw the flanges 35 and 35a together and at the same time drive the wedges 45 against the shaft 30 by reason of the wedging action. The pressure exerted by the bolts 52 is cumulative and the force holding the flanges 35 and 35a against the wheel is the sum of all the forces exerted by the bolts 52 and, therefore, may in total be very considerable; on the other hand, there is little danger of both of the nuts 54 sticking upon a particular shaft 52 and so the mounting may be readily disassembled. The cover flanges 55 may now be applied, if desired.

In Figures 5 and 6, I have illustrated a modification of the invention in which flanges 35b and 35c are provided of slightly different shape, other parts and portions being substantially the same excepting that the end surface 51a is radial. In this embodiment of the invention, I provide a number of cylindrical holes 60 in the flanges 35b and 35c and locate therein large studs 61. The cement center 11, 20a of the wheel has a series of oversized holes 62 angularly spaced to correspond with the heads 63 of the studs 61. The heads 63 extend into the holes 62 when the parts are assembled and after they are assembled and the bolts 52 are tightened, cement grouting or the like is introduced in channels 64 provided in the ends of the flanges 35c and 35d and this grouting embeds the studs 61 in place as shown. In order to put the parts together in the first place, the wheel and right-hand flange 35b will be backed away from the flange 35c, as the flange 35c is being interlocked with the lugs 32. Thereupon the wheel and flange 35b may be advanced to the left, Figure 5, to assemble the parts. The construction and assembly of the embodiment of the invention shown in Figures 5 and 6 is otherwise the same as described in connection with the embodiment of Figures 1, 2, 3 and 4.

In the embodiment of Figures 5 and 6, flanges 35b and 35c drive the wheel by means of the studs 61 which are virtually embedded in the wheel as shown. Thus a very positive driving connection is provided. The shaft 30 drives the flanges 35b and 35c through the lugs 32 which are integral with the shaft 30 and the wedge blocks 45. In both embodiments lost motion is largely eliminated by reason of the tight connections described, involving the individual tightening of the bolts 52 and the powerful wedging action of the wedge blocks. In the embodiment of Figures 1 to 4 inclusive the flanges act to keep the wheel in central position by reason of the conical shape of the ends 51 of the wheel. In the embodiment of Figures 1 to 4 inclusive the flanges 35 and 35a are driven positively, as described, while pressure is relied upon to drive the wheel from the flanges. By reason of the many bolts provided (the drawings showing sixteen bolts), the parts can be drawn together so tightly that an efficient driving connection is assured. Pulpstones of the type described are embodied in very large and heavy units and by reason of the distribution of the clamping forces between sixteen bolts, it is very much easier to disassemble the mounting than it has been in the case of many prior constructions. It will be seen that expansion and contraction of the stone axially is duly provided for in so much as the flange 35 and the flange 35b are neither of them secured from axial movement relative to the shaft 30. The elastic bolts 52 are capable of being stretched by the expansive force of the stone when heated without breaking.

During pulp grinding a great amount of heat is created and this is counteracted by the shower water, which is usually adjusted so as to give a temperature of 160–180° F. in the pulp pit; however, conditions met with during starting, running and stopping of the grinding involve considerable variation with respect to the temperature of the various parts or portions of the stone. The slightest looseness between shaft and the flanges is quickly increased by the heavy pressure from the wood. Such looseness and the detrimental results thereof are prevented by the wedge keys and the elastic bolts which are subjected to an initial strain of such magnitude that the wedges are forced to a firm seat between the shaft and the flanges and at the same time the wedges clamp the flanges against the stone with a sufficient force to drive the stone under all conditions of temperature variations.

In all embodiments of the invention, the elastic bolts 52 may be put under tension of many thousand pounds which effectively holds the entire structure together. This pressure of the elastic bolts 52 holds the wedge blocks 45 against the shaft 30 with much greater pressure owing to the wedging action. Thus side play, vibration and gradual enlargement of the slots between lugs 32 is avoided, even under conditions of use involving the enormous pressures which are met with in pulp grinding. At the same time, upon expansion of the concrete 11 or the stone as a whole, due to overheating for any cause, the bolts 52 can stretch without generating such excessive forces as will cause a breakage somewhere. The particular feature of elastic bolts in this connection is that the curve of increase of tension against elongation has a much more gentle slope than in the case of a heavy part such as the shaft 30 itself.

It will thus be seen that there has been provided by this invention apparatus in which the various objects hereinabove set forth together with many thoroughly practical advantages are successfully achieved. As various possible embodiments might be made of the mechanical features of the above invention and as the art herein described might be varied in various parts, all without departing from the scope of the invention, it is to be understood that all matter hereinbefore set forth or shown in the accompanying drawings is to be interpreted as illustrative and not in a limiting sense.

I claim:—

1. In apparatus of the class described, a shaft, a flange, a plurality of keys in each flange and locked to the shaft, a wheel on the shaft between the flanges, and bolts extending between the flanges and passing through the keys.

2. In apparatus as claimed in claim 1, the combination with the parts and features therein specified, of wedge shaped keys whereby the parts are securely locked against lost motion or play.

3. In apparatus of the class described, a wheel, a shaft, a pair of flanges on the shaft and at opposite ends of the wheel, a plurality of wedge blocks in the flanges, and bolts extending through the wedge blocks and holding the wedge blocks against the flanges and in engagement with the shaft.

4. In apparatus of the class described, a wheel or stone, a shaft, a pair of flanges, a plurality of wedge keys in each flange, fitting into keyways in the shaft and long elastic bolts through the wedge keys, pulling the keys together and firmly clamping the flanges to the shaft and to the stone under any possible condition of temperature difference between the various parts.

THURE LARSSON.